Feb. 12, 1929.

J. R. WOOD

MOLDING MACHINE

Filed June 2, 1926    4 Sheets-Sheet 1

1,701,598

Inventor
John R. Wood.
By Joseph W. Hazell
Attorney

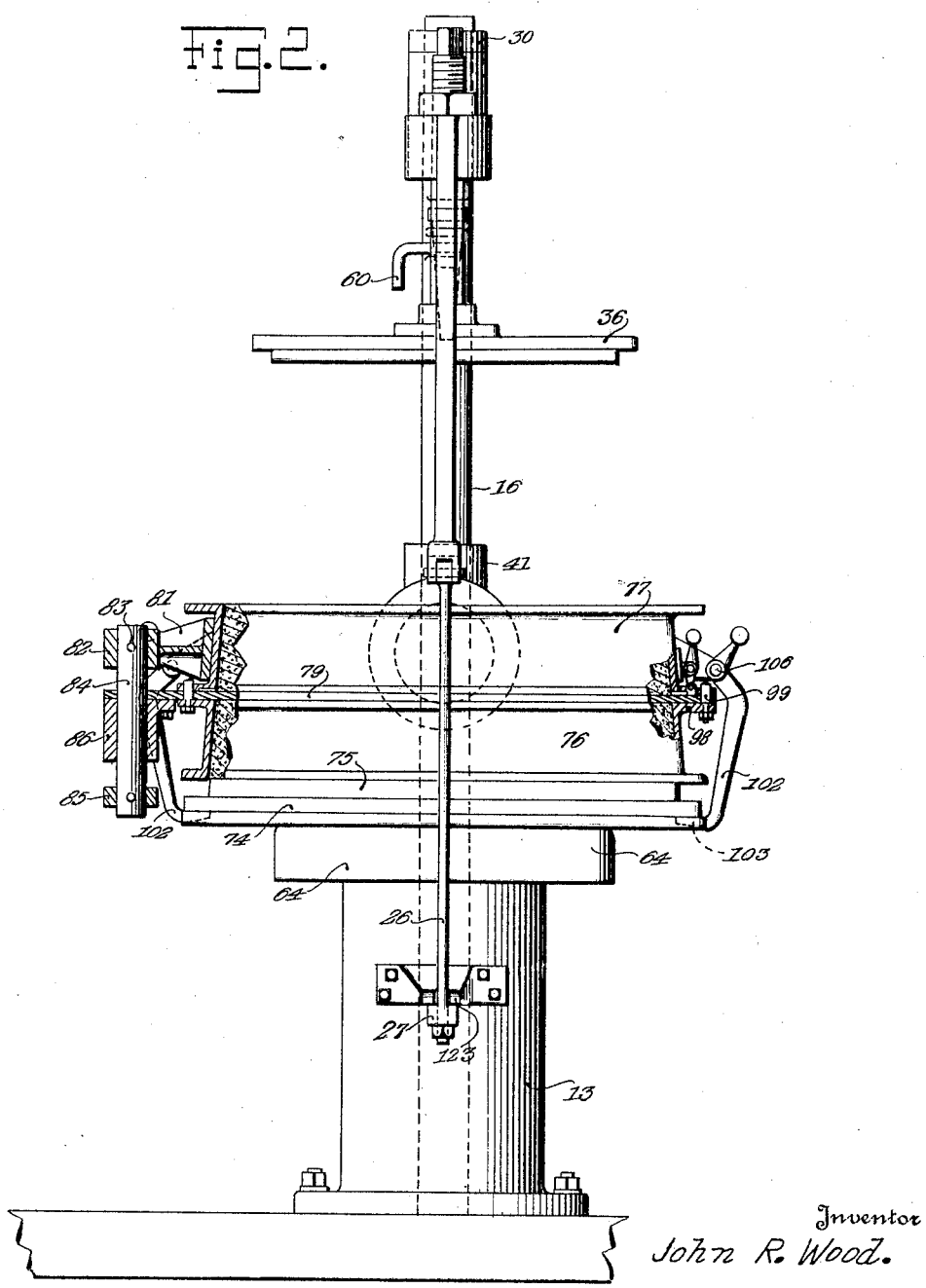

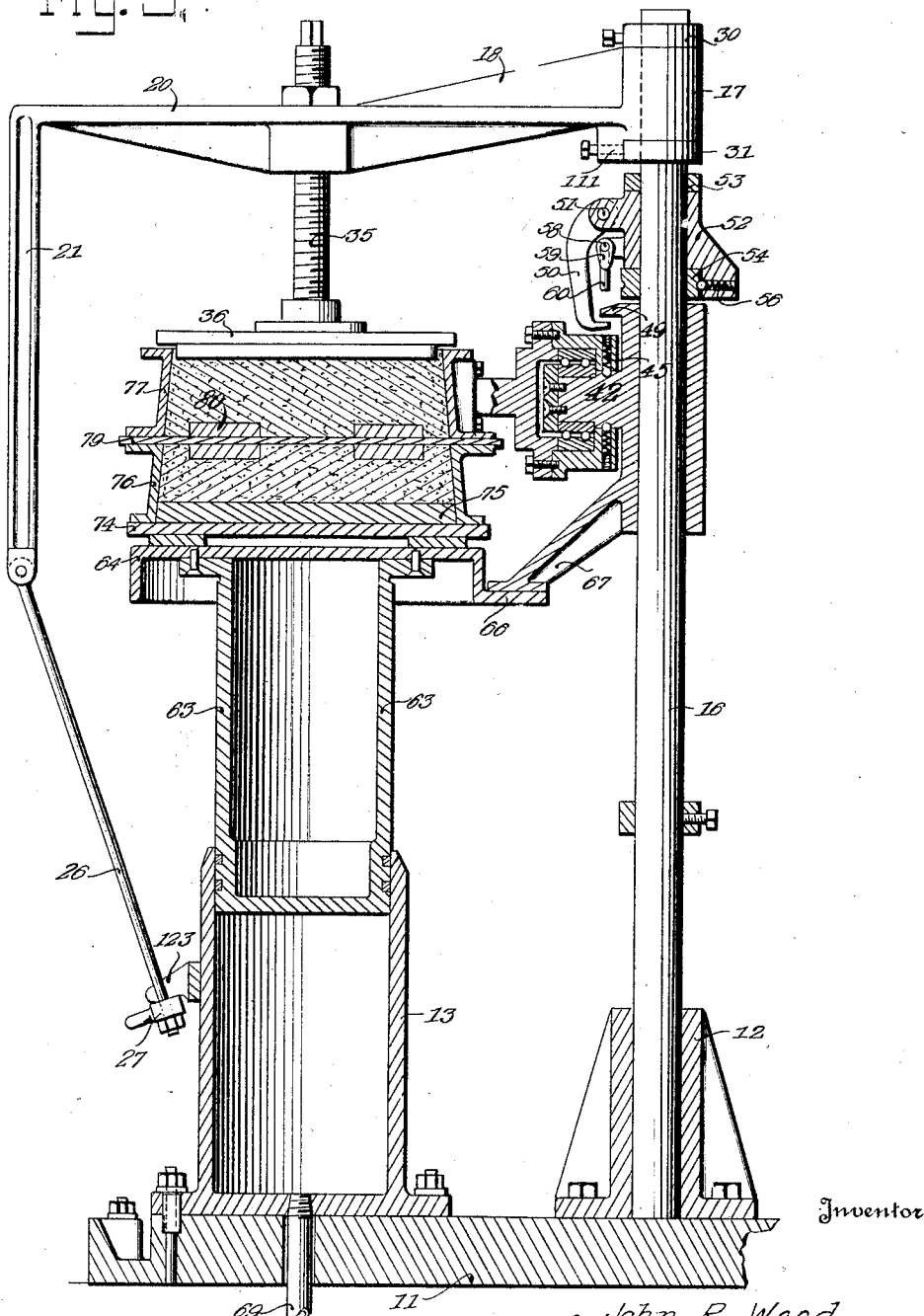

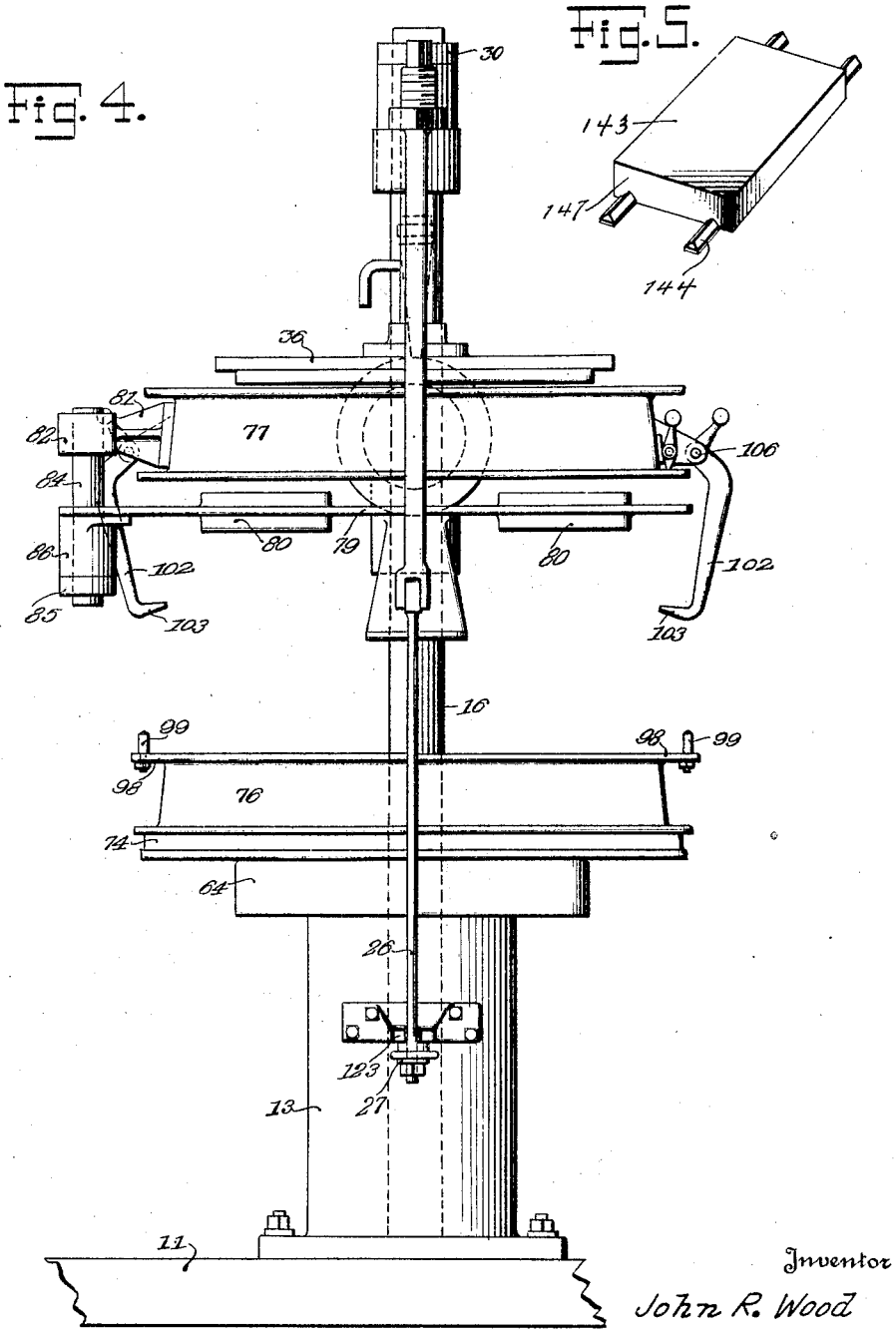

Patented Feb. 12, 1929.

1,701,598

UNITED STATES PATENT OFFICE.

JOHN RICHARD WOOD, OF HATBORO, PENNSYLVANIA, ASSIGNOR TO NEW PROCESS MULTI-CASTINGS COMPANY, A CORPORATION OF NEW JERSEY.

MOLDING MACHINE.

Application filed June 2, 1926. Serial No. 113,110.

The present invention relates to molding machinery, and more particularly to a machine for making two parts of a mold simultaneously.

It is one of the objects of the invention to provide a machine by which a series of identical molds may be made with a single flask, and by which the pattern impressions are formed in both of the two mold sections simultaneously.

It is a further object of the invention to provide a machine by which the pattern impressions in both halves of a two part mold are formed simultaneously by squeezing.

A still further object of the invention is to provide such a machine by which the number of operations heretofore required for making a complete mold, and the time required therefor, are materially reduced.

Other objects and advantages of the invention will appear from the following description, taken in connection with the accompanying drawings, which illustrate, by way of example, a preferred form of machine embodying the invention. The machine is illustrated by way of example, and not as a definition of the limits of the invention, reference being had to the appended claim for that purpose.

Of the drawings:

Fig. 2 is a front elevation, partly in section, of the machine of Fig. 1;

Fig. 3 is a side elevation, partly in section, showing the parts in a different position;

Fig. 4 is an end elevation of the machine, showing the parts in still another position, and Fig. 5 is a perspective view of a modified form of plate.

Figure 1:
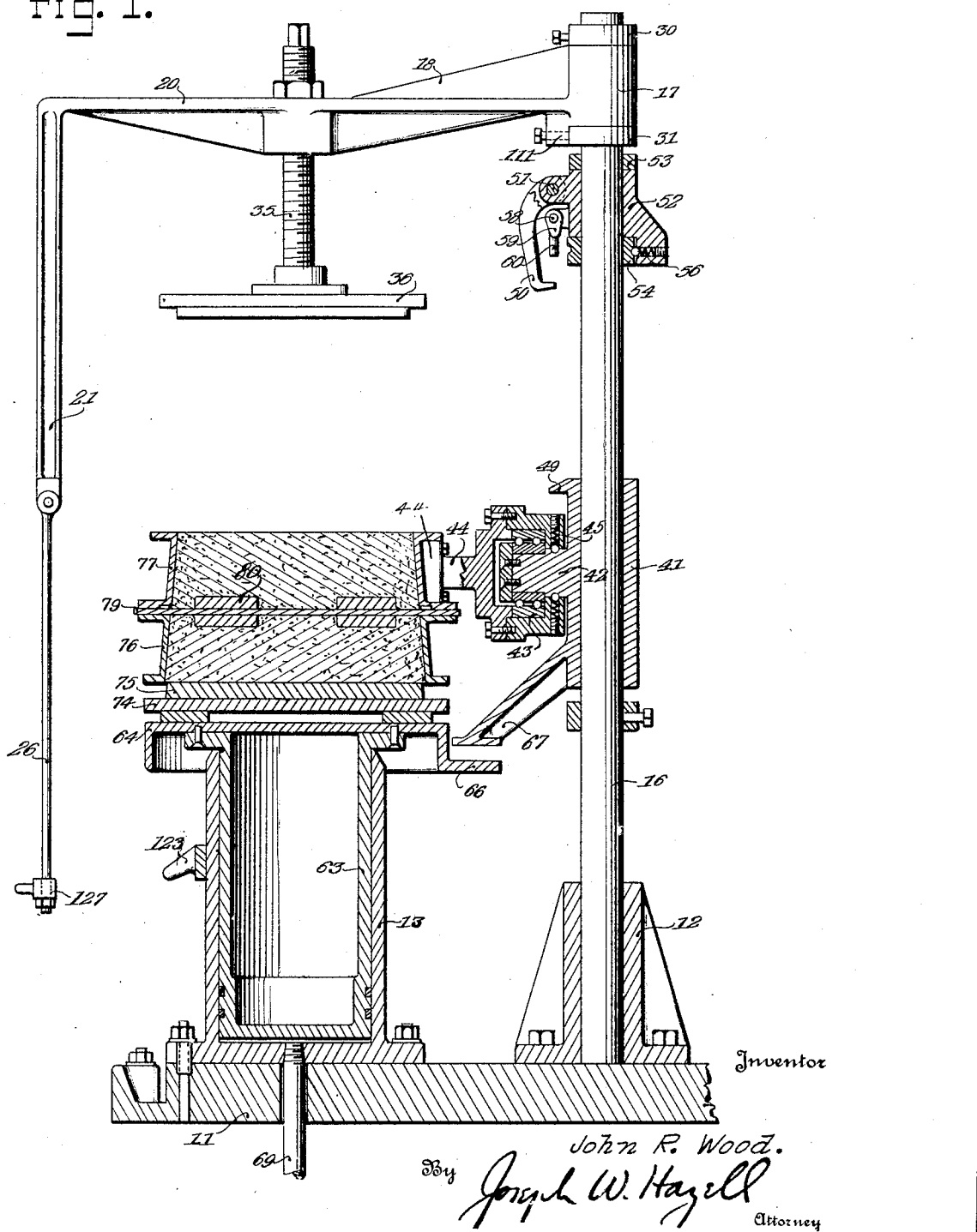
Fig. 1 is a side elevation, partly in section, of a preferred form of embodiment of the machine of the invention.

Referring in detail to the accompanying drawings, which illustrate, by way of example, a preferred embodiment of the present invention, a bed plate 11 is provided on and anchored to any suitable foundation such, for example, as a concrete block. Fixed on the bed plate 11, and extending upwardly therefrom, are a standard support 12 and a stationary table cylinder 13. Fixed within the standard support 12 is a vertically extending standard 16, on the top of which is rotatably mounted the sleeve portion 17 of a squeeze head arm 18, which is provided with the substantially horizontal squeeze head carrying portion 20 and with the downwardly extending end portion 21, to the lower end of which is pivotally secured a bracing and securing rod 26, whose lower end is provided with a lug engaging member 27, for a purpose hereinafter described. Associated with the sleeve portion 17 of the squeeze head arm is an upper bearing collar 30 and a lower bearing collar 31, which collars are fixed upon the standard 16. Adjustably carried in the squeeze head arm 18, and projecting downwardly therefrom, is a squeeze head adjusting and supporting shaft 35 removably carrying at its lower end the squeeze head 36. The squeeze head 36 is thus adapted to be moved in a horizontal plane about the standard 16 as an axis.

Slidably mounted on the standard 16 is a flask supporting sleeve block 41 having preferably formed integral therewith and projecting horizontally therefrom an arbor 42. Rotatably mounted on the arbor 42 by ball bearings 43, or otherwise, is a flask supporting arm 44, which is accurately positionable either in upright or inverted position by means of one or more ball stops 45, each of which is adapted to project into either of a pair of hemispherical depressions formed 180 degrees apart in the arbor 42.

The sliding sleeve block 41 is provided at its upper end with a beveled latch portion 49, which is adapted in the uppermost position of said sliding block to be engaged by a swinging downwardly extending hook 50 pivoted at 51 to a hook support 52 rotatably, but non-slidably, mounted on the standard 16 and held against axial movement thereon by means of upper and lower fixed bearing collars 53 and 54, one of which may be provided with hemispherical depressions for the reception of a portion of a spring pressed ball stop 56 provided on the hook block 52 for the purpose of accurately positioning said hook block in one or more positions with respect to the standard 16. Means are provided for releasing the latch 49 by outward movement away from the standard of the hook 50, and for this purpose a rotatable cam shaft 58 is provided on the hook block 52 and has affixed thereon a cam 59 adapted on rotation of said shaft by its handle 60 to engage and cam outwardly the hook 50, thus releasing the sleeve block 41 and permitting it to move downwardly.

Associated with the stationary cylinder 13 is a vertically movable, but non-rotatable, piston 63 provided with the horizontal table top 64 and also provided with the horizontally extending lifting shoulder 66 adapted to be engaged by the downwardly extending lifting arm 67 fixed at its upper end to the sliding sleeve block 41.

The piston 63 and the cylinder 13 are assembled to form an expansible chamber provided with an inlet pipe 69 leading to any source of suitable pressure-exerting fluid such as compressed air, whose inlet to and exhaust from the expansible chamber may be controlled by any suitable form of hand operated valve.

A bottom board 74 is provided having on its underside the usual cross pieces and having on its upper side a squeeze plate 75, which is adapted under certain conditions to enter the interior of a drag member 76 forming part of the flask, to the cope member 77 of which is fixed a securing plate 46, by which the cope is bolted or otherwise rigidly secured to the rotatable flask arm 44.

A pattern plate 79 provided with patterns 80 is preferably permanently mounted on the machine, the word "permanently" being used in the sense that during the making of a given series of molds for a particular job, the pattern plate is attached to the machine and remains attached thereto until completion of as many molds as may be required. Thereafter it may be removed and a new pattern plate substituted.

As shown in the drawings and particularly Figs. 2 and 4, the cope 77 is provided with a bracket 81 provided at its outer end with a bearing 83, which has fixed therein by pins 83 or otherwise the downwardly extending shaft 84 provided at its lower end with a fixed collar 85. Journaled on the shaft 84 is a sleeve 86, to the upper end of which is fixed the pattern plate 79. The sleeve 86 and collar 85 are spaced apart sufficiently to permit the sleeve 86, carrying with it the pattern plate 79, to move downwardly on the shaft 84 far enough to withdraw the patterns 80 clear of the cope mold and thus to permit the pattern plate 79 on the sleeve 86 to be swung in a horizontal plane about the shaft 84 away from its position over the table 64.

For the purpose of accurately positioning the flask parts and pattern plate in assembled relation, the drag member 76 is provided with laterally extending lugs 98 carrying pins 99, which are adapted to pass through corresponding openings provided in the pattern plate 79 and also in the lower portion of the cope member 77.

For the purpose of securing the bottom board 74 and drag member 76 to the cope member 77 with the pattern plate 79 between the cope and drag and with all these parts in fixed relation with respect to each other, a plurality of bottom board retaining hooks 102 may be provided having lower hook portions 103 adapted to engage beneath the bottom board 74 and pivoted intermediate their ends, as at 106, to the cope member 77.

For the purpose of accurately positioning the squeeze head 36 in vertical alignment with the flask parts, a ball positioning stop 111 similar to the spring pressed ball stop 56 may be provided for cooperation with suitably located hemispherical depressions formed in the collar 31.

In Fig. 5 is illustrated a modified form of bottom board which may advantageously be used in the machine above described and for carrying out the process of the present invention.

As shown in said figure, the bottom board 143 is provided with the laterally extending triangular portions 144, whose formation prevents any sand from accumulating upon them, and with the squeezing portion 147 adapted to enter the bottom of the drag, upon suitable pressure, the maximum distance which it is adapted to move into the drag, being determined by the vertical distance between the top of the lateral triangular members and the top surface of the board. The top edges of the triangular members also act as stops, and in the squeezed position the lower edges of the drag member are adapted to rest upon the triangular members. In the preferred embodiment of this form of bottom board, the triangular members are preferably made of metal, and the flat squeezing portion is preferably made of wood, though it will be understood that the precise material or materials of which the bottom board is made may be changed as may be desired.

The operation of the foregoing machine in carrying out the process of the present invention is as follows:

Assuming the flash parts to be in the inverted position with the pattern plate 79 therebetween, and resting upon the lowered table top 64, with the squeeze head 36 swung out of vertical alignment for convenience in introducing molding sand into the flash, the drag member of the flash is filled with molding sand and the surplus struck off even with the bottom edges of the drag. Thereupon the bottom board 74 is placed upon the drag member with the squeeze plate 75 in position to enter the drag member under pressure and compress the sand therein, the bottom board being held in position by the bottom board retaining hooks 102.

The table 64 is then raised by compressed air, or otherwise, until the hook 50 engages the latch 49, thus retaining the sleeve block 41 in upper position. The table is then lowered and the flash parts rolled over, after which the table 64 is again raised until the table top contacts with the bottom board 74.

The hook 50 is released by operating the cam 59, and the table is then lowered carrying downwardly with it the flask parts in upright position together with the sleeve block 41.

Thereupon molding sand is introduced into the cope member 77, and the surplus sand struck off in the usual manner. The squeeze head 36 is then brought into vertical alignment with the flask parts directly over the cope, and the lug engaging member 27 of the pivoted rod 26 is engaged with the stationary lug 123 for bracing the outer end of the squeeze head arm 18 is squeezing position, the pivoted end of said arm being held against upward movement by the upper bearing collar 30.

With the parts in the position described, the bottom board retaining hooks are moved to bottom board releasing position and far enough outwardly so they will not be engaged by the table top 64. The table top 64 is then raised and carries upwardly with it the filled flask parts 76 and 77 supported upon the squeeze plate 75. When the cope mold contacts with the squeeze head 36, the table 64 continuing its upward movement, the cope mold will be compressed downwardly against the pattern plate by the squeeze head 36, and the drag mold will be compressed upwardly against the pattern plate by the squeeze plate 75 until the squeeze plate 75 has entered its maximum distance into the drag member and the lower edges of the drag rest upon the bottom board 74, as shown in Fig. 3. It is obvious that under different circumstances, squeeze plates 75 of different thicknesses may be required. When the drag rests upon the bottom board, the lifting shoulder 66 contacts with the lower end of the lifting arm 67.

With the retaining hook 50 in engagement with the latch 49, the bottom board retaining hooks being in their disengaged position, the pattern is drawn by lowering the table top 64, which carries downwardly with it the bottom board 74, the squeeze plate 75, the filled drag member 76, and the pattern plate 79, the latter of which rides downwardly on the drag until it is stopped by the collar 85, as shown in Fig. 4, this stop being held stationary as it is fixed to the cope, which at this time is being held in its uppermost position. After the pattern plate has been stopped, the table continues its downward movement and carries downwardly with it the drag. As soon as the pattern plate is clear of the mold parts, it may be swung aside in a horizontal plane about its pivot 84. The mold is then closed by raising the table until the drag mold contacts with the cope mold, whereupon the cope sand-retaining slides such as shown in my United States Patent No. 1,676,199, are moved outwardly, and the table is again lowered with the cope retained in its uppermost position, and the table carrying downwardly with it the drag 76 with the drag mold contained therein and the cope mold resting on the drag mold in assembled position. The drag may then be lifted off the mold and the bottom board 74 removed with the mold resting thereon. A pouring jacket may be slipped over the mold, and the casting poured. Meanwhile the flask parts and pattern plate are reassembled in a manner which will be obvious from the foregoing, and the parts are then in position for the making of another mold.

What is claimed is:

In a molding machine, a two-part flask, an element revolubly supporting said flask to permit the same to be rolled over, a pattern plate between the two flask parts slidably and pivotally connected to one of them, devices for simultaneously compressing molding sand in both of said flask parts against said pattern plate, and means for drawing said pattern.

In testimony whereof I affix my signature.

JOHN RICHARD WOOD.